No. 792,826.

Patented June 20, 1905.

UNITED STATES PATENT OFFICE.

FRITZ HILPERT, OF NUREMBERG, GERMANY.

METHOD OF COATING MATERIALS WITH SILVER.

SPECIFICATION forming part of Letters Patent No. 792,826, dated June 20, 1905.

Application filed August 22, 1903. Serial No. 170,484.

*To all whom it may concern:*

Be it known that I, FRITZ HILPERT, a subject of the Emperor of Germany, residing at Nuremberg, Germany, have invented certain new and useful Improvements in Methods of Coating Materials with Silver, of which the following is a specification.

The object of this process is to provide a glazed shining surface of silver or other precious metal to paper, leather, or similar materials either in an even form or in different-colored patterns.

For this process a silver solution is used, which will be fully described hereinafter, and also a specially-prepared reducing solution, which will also be described hereinafter.

In order to provide an efficient process, an equal quantity of each solution should be used, the solutions being placed in a vessel and thoroughly mixed. This mixture, which is in a fluid state, is spread out evenly over a carefully-cleaned flawless polished glass plate. After from twenty to twenty-five minutes the liquid is removed from the plate, leaving a deposit of silver which adheres to the glass. When the silver deposit has become dry, the plate is washed and is ready for the next step in the process.

In order to transfer the layer of silver from the plate to the paper, leather, or other similar material, the latter is coated with a weak warm solution of gelatin or shellac and allowed to stand for two or three minutes. The paper or other material is then placed upon the plate with the shellac next to the silver film and smoothed down with a roller. The plate, with the paper or other material attached thereto, is then placed into a heated room to dry. During the process of drying the gelatin or shellac unites the silver film firmly with the paper, so that by simply tearing off the latter the silver is removed therewith and forms a layer thereon. By using a flawless polished glass plate the silver film adhering to the desired material will be formed with a perfectly smooth and brilliant surface. Special importance is attached to the fact that the silver can be withdrawn very easily from the glass plate, and for this reason only glass plates can be used. As it is known that silver and other precious metals have a corroding influence on other materials, they can only retain a smooth surface when drawn from glass. As the silver layer thus formed on the paper, leather, or other material does not have the necessary firmness, it is painted over with a transparent neutral shellac of any desired color, which makes it stronger and more firm.

A preferred silver solution is formed in the following manner: Ten grams of nitrate of silver are dissolved in fifty grams of water and ammonia added until the yellow deposit which is formed dissolves again and the liquid becomes clear. This solution is then diluted with water to form one liter. The reducing solution is formed in the following manner: Twenty grams of Rochelle salt and twenty grams of white rock-sugar are dissolved in two hundred grams of water. A solution of four grams of nitrate of silver in twenty grams of water is added to the above solution. The nitrate-of-silver solution and the reducing solution are then mixed together and boiled for about half an hour. The combined solution is then diluted with water and carefully filtered.

What I claim, and desire to secure by Letters Patent, is—

A method of the character herein set forth for forming a glazed metallic surface on paper or other materials, which consists in forming a solution of nitrate of silver and water, adding ammonia to said solution until a yellow deposit appears and is again dissolved, diluting said solution with water; preparing a reducing solution composed of a solution of equal parts of Rochelle salt and rock-candy in water to which is added nitrate of silver dissolved in water; mixing said solutions and diluting the same, and boiling for a short time; then spreading the mixed solution evenly on a glass plate and allowing a deposit to be formed thereon, then drying and washing said plate; preparing the paper or similar substance with a coating of adhesive material and placing the same on said plate with the adhesive material upon the silver coating, then drying the plate with the paper thereon and subsequently withdrawing the paper with the adhering silver deposit, and finally coating the deposit with a transparent neutral shellac, substantially as described.

In testimony that I claim the foregoing as my invention I have signed my name in presence of two subscribing witnesses.

FRITZ HILPERT.

Witnesses:
  OSCAR BOCK,
  JOSEF JERRYKOWSKI.